(12) United States Patent
Posch et al.

(10) Patent No.: US 7,539,588 B2
(45) Date of Patent: May 26, 2009

(54) DATA CARRIER WITH DETECTION MEANS FOR DETECTING A CHANGE MADE OF INFORMATION STORED WITH STORING MEANS

(75) Inventors: Martin Posch, Graz (AT); Helmut Haar, Kainbach bei Graz (AT)

(73) Assignee: NXP B.V., Eindhoven (NL)

( * ) Notice: Subject to any disclaimer, the term of this patent is extended or adjusted under 35 U.S.C. 154(b) by 343 days.

(21) Appl. No.: 10/519,592

(22) PCT Filed: May 16, 2003

(86) PCT No.: PCT/IB03/02022

§ 371 (c)(1),
(2), (4) Date: Dec. 27, 2004

(87) PCT Pub. No.: WO2004/003838

PCT Pub. Date: Jan. 8, 2004

(65) Prior Publication Data

US 2005/0240371 A1 Oct. 27, 2005

(30) Foreign Application Priority Data

Jun. 28, 2002 (EP) .................................. 02100761

(51) Int. Cl.
*G01R 31/00* (2006.01)
*G01R 31/14* (2006.01)
(52) U.S. Cl. ....................................... 702/117; 702/119
(58) Field of Classification Search ......... 702/117–119; 714/25, 30, 718; 365/189.011, 201
See application file for complete search history.

(56) References Cited

U.S. PATENT DOCUMENTS

| | | | | |
|---|---|---|---|---|
| 5,467,081 A | * | 11/1995 | Drews et al. | 340/5.22 |
| 5,471,045 A | | 11/1995 | Geronimi | |
| 6,475,817 B2 | * | 11/2002 | Bergler et al. | 438/17 |
| 6,800,894 B1 | * | 10/2004 | Furuhata | 257/315 |
| 7,232,983 B2 | * | 6/2007 | Garbe et al. | 250/214 R |
| 2001/0028691 A1 | * | 10/2001 | Posch | 375/340 |
| 2002/0108051 A1 | * | 8/2002 | Fougeroux et al. | 713/193 |
| 2003/0043896 A1 | * | 3/2003 | Proidl | 375/224 |
| 2006/0155882 A1 | * | 7/2006 | Jochemsen et al. | 710/3 |

FOREIGN PATENT DOCUMENTS

| | | | |
|---|---|---|---|
| DE | 42 05 567 | * | 8/1993 |
| FR | 2 810 138 | | 11/1995 |
| JP | 05-265866 | * | 10/1993 |
| WO | 02/009153 A3 | * | 1/2002 |

* cited by examiner

*Primary Examiner*—Michael P Nghiem

(57) ABSTRACT

A circuit has a first memory for modifiable storage of information, the information being modifiable by an ambient parameter of the circuit, which ambient parameter acts on the first memory. The first memory includes a test memory area for storing test information. The circuit also includes a second memory for unmodifiable storage of reference information and a detection circuit. The test information and reference information is supplied to the detection circuit. The detection circuit then detects whether a modification of the originally stored test information has been brought about by an ambient parameter acting on the first memory.

17 Claims, 2 Drawing Sheets

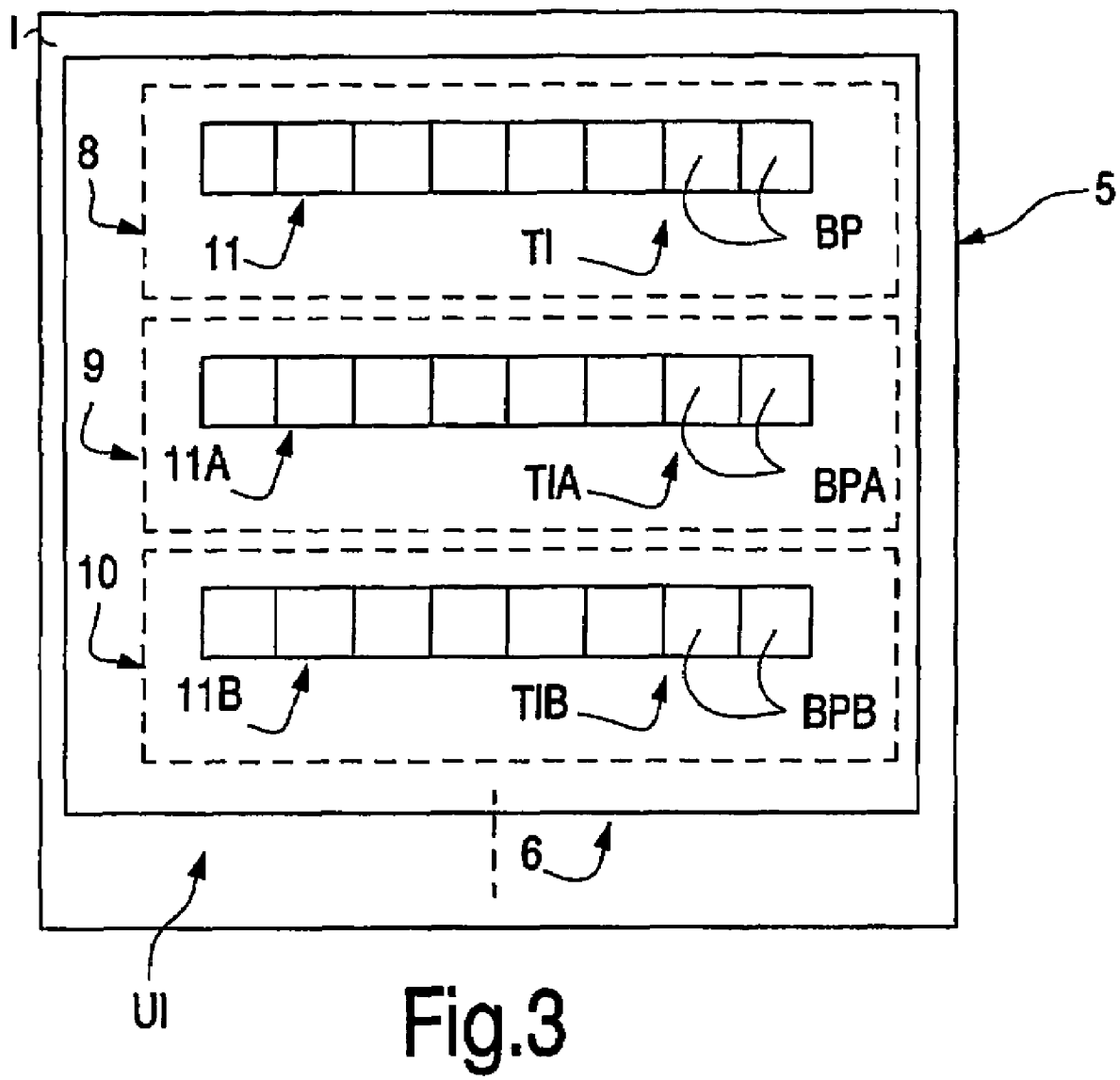

DATA CARRIER WITH DETECTION MEANS FOR DETECTING A CHANGE MADE OF INFORMATION STORED WITH STORING MEANS

This application is a 371 of PCT/IB03/02022 filed on May 16, 2003.

The invention relates to a data carrier comprising a circuit, which circuit comprises the following components, namely first memory means, which are designed for modifiable storage of information, the information being modifiable by an ambient parameter of the circuit, which ambient parameter acts on the first memory means.

The invention also relates to a circuit, which circuit comprises the following components, namely first memory means, which are designed for modifiable storage of information, the information being modifiable by an ambient parameter of the circuit, which ambient parameter acts on the first memory means.

Such a data carrier of the type described above in the first paragraph and such a circuit of the type described above in the second paragraph are known from document DE 42 05 567 A1.

The known data carrier, which is designed for contactless communication with a read/write station and which comprises the known circuit, comprises first memory means which are designed for modifiable storage of information. The data carrier also comprises an access control means and a bus connection between the first memory means and the access control means, wherein, in normal operation, the information stored in the first memory means may be modified by desired electrical accessing of the access control means via the bus connection to the first memory means.

In the case of the known data carrier, the problem arises that the information stored in the first memory means can be modified not only by desired access via the bus connection but also in another manner, namely by the undesired effect of an ambient parameter acting on the first memory means, such as for example a short-wave light or an electrical field or a high temperature. A modification of the stored information brought about in this way may lead to complete failure of the data carrier or to dangerous malfunctioning of the data carrier or may possibly even be exploited for criminal purposes.

It is an object of the invention to eliminate the above-listed problems associated with a data carrier of the type described above in the first paragraph and a circuit of the type described above in the second paragraph and to provide an improved data carrier and an improved circuit.

To achieve the above-described object with regard to a data carrier of the type described above in the first paragraph, the first memory means comprise a test memory area, which is provided for storing test information, and second memory means are provided which are designed for unmodifiable storage of reference information, and detection means are provided, to which the test information which may be read out from the first memory means and the reference information which may be read out from the second memory means may be supplied and which are designed, with the aid of the read-out test information and the read-out reference information, to detect a modification of the originally stored test information brought about by an ambient parameter acting on the first memory means.

To achieve the above-described object with regard to a circuit of the type described above in the second paragraph, the first memory means comprise a test memory area, which is provided for storing test information, and second memory means are provided which are designed for unmodifiable storage of reference information, and detection means are provided, to which the test information which may be read out from the first memory means and the reference information which may be read out from the second memory means may be supplied and which are designed, with the aid of the read-out test information and the read-out reference information, to detect a modification of the originally stored test information brought about by an ambient parameter acting on the first memory means.

The advantage is thereby achieved that an unambiguous statement as to whether the information stored in the first memory means has or has not been modified by an ambient parameter, and consequently in relation to the invalidity or validity respectively of the information stored in the first memory means may be made in a reliable and reproducible manner. In addition, the advantage is achieved that modification of the stored information which is caused unintentionally, i.e. accidentally by an ambient parameter modifying the originally stored information, or intentionally, i.e. for purely technical or even criminal reasons, may be detected virtually one hundred percent reliably because the test information and the information are stored together in the first memory means and therefore are jointly exposed to the ambient parameter acting on the first memory means and are jointly subject to a modification caused thereby.

A solution according to the invention may for example be characterized in that the test information or the reference information are stored in encrypted manner for security reasons and that the detection means comprise decrypting means for decrypting at least one of the two information elements. In addition, a solution according to the invention may be characterized in that the detection means may be designed to compare a representation of the test information with a representation of the reference information, which two representations may be calculated by suitable calculating methods. In addition, the detection means may be designed to perform a so-called coincidence method. In addition, the detection means may be realized as correlator. However, it has proven particularly advantageous for the features as claimed in claim 2 or claim 7 to be provided. The advantage is thereby achieved that a reliable statement with regard to a possible modification and consequently the possible invalidity of the information stored in the first memory means may be made by a quick comparison, which may even be performed purely at a hardware level.

In the case of a solution according to the invention, it has also proven advantageous to include an enabling circuit for the purpose of irreversibly enabling functioning of the detection circuit. In this way, the advantage is achieved that, during a testing state time period, as provided for example during or after production of the circuit, functioning of the detection means may be prevented. In addition, the advantage is achieved that functioning of the detection means may be started at a well-defined time and that this functioning of the detection means can no longer be cancelled once started, whereby, from this time onwards, any modification of the information stored in the first memory means brought about by an ambient parameter for whatever reason may be reliably detected.

In the case of a solution according to the invention, it has also proven advantageous to generate and output an indicator signal to indicate a modification of the originally stored test information brought about by an ambient parameter acting on the first memory. In this way, the advantage is achieved that, after detection of a modification of the test information brought about by the ambient parameter acting on the first memory means, operating behavior may be influenced to the effect that any criminally motivated use of the circuit or of the data carrier is reliably prevented.

In the case of a solution according to the invention, it has also proven advantageous to form the test information of at least two bits that differ from one another with regard to their logical value. In this way, the advantage is achieved that the test information is represented by a bit sequence which comprises only bits with logical values which do not occur during production of the first memory means or are not present after a modification of the information stored in the first memory means brought about by the action of an ambient parameter on the first memory means, wherein it may be mentioned, for the sake of completeness, that in both cases each bit of the first memory means represents either a logical one or a logical zero.

In the case of a solution according to the invention, it has also proven advantageous to provide the circuit in the form of an integrated circuit. In this way, the advantage is achieved that the circuit may be produced as economically as possible on a large scale.

The above-stated aspects of the invention and further aspects thereof emerge from the examples of embodiment described below and are explained with reference to these examples of embodiment.

The invention will be further described with reference to examples of embodiments shown in the drawings to which, however, the invention is not restricted.

FIG. 3 shows a data structure for storing information in the first memory means of a data carrier according to the invention, in accordance with a second example of embodiment of the invention.

Figure 1:
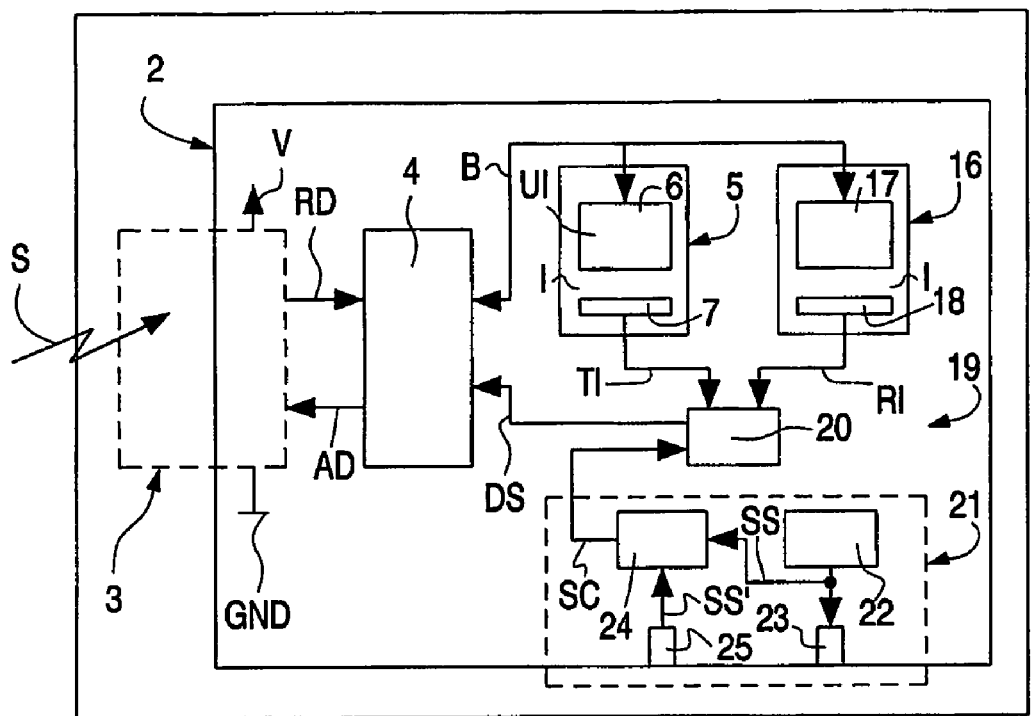
FIG. 1 is a schematic representation, in the form of a block diagram, of a data carrier according to a first example of embodiment of the invention.

FIG. 1 shows a data carrier 1, which is designed for contactless communication with a communications station not illustrated in FIG. 1. To this end, the data carrier 1 is designed to receive a signal S from the communications station in contactless manner, wherein the signal is formed by a high-frequency carrier wave and wherein the data carrier 1 may be supplied with power by means of the signal S. In addition, interrogation information may be communicated from the communications station to the data carrier 1 by means of the signal S, wherein the signal exhibits amplitude modulation of the carrier wave. In addition, response information may be communicated from the data carrier 1 to the communications station by means of the signal S, wherein the signal S exhibits load modulation of the carrier wave which may be brought about by the data carrier 1. It should be mentioned that phase or frequency modulation of the carrier wave may also be provided for communication purposes.

The data carrier 1 comprises an electrical integrated circuit 2. The circuit 2 comprises components of transceiver means 3, which are designed to receive the signal S. To this end, the transceiver means 3 exhibit a transmission coil configuration, not shown in FIG. 1, which is coupled to the circuit 2, such that the signal S arising at the transmission coil configuration may be supplied to the circuit 2. The transceiver means 3 are additionally designed, using the signal S, to generate a supply voltage V relative to a reference potential GND for the circuit 2. The transceiver means 3 are additionally designed to demodulate the in this case modulated received signal S and to output interrogation data RD communicated by means of the modulated received signal S. The transceiver means 3 are additionally designed to receive response data AD and, for the purpose of transmitting the response data AD, for load modulation of the in this case unmodulated received signal S.

The circuit 2 further comprises data processing means 4, which take the form of a hard-wired logic circuit. The data processing means 4 may also take the form of a microcomputer. The data processing means 4 are designed to receive the interrogation data RD and to process the interrogation data RD and, as a function of the interrogation data RD, to generate the response data AD and to output the response data AD to the transceiver means 3.

The circuit 2 comprises first memory means 5, which are designed for modifiable storage of information I, the information I being modifiable by an ambient parameter of the circuit 2, which ambient parameter acts on the first memory means 5. In the present case, the first memory means 5 take the form of an EEPROM. It should be mentioned at this point that the first memory means 5 may, however, also take the form of other non-volatile read/write memories, such as for example an EPROM, a FLASH memory or a magnetic RAM. According to the invention, as soon as the first memory means 5 are exposed to an ambient parameter, such as for example a short-wave light, a high temperature of a relatively strong electromagnetic field, modification of the stored information I is brought about by this ambient parameter. This modification usually deletes the information I or at least renders it unusable. The first memory means 5 comprise a first user memory area 6 and a test memory area 7. The test memory area 7 is provided for storage of test information TI. The user memory area 6 is provided for storage of user information UI. The information I storable in the first memory means 5 is consequently formed of the user information UI and the test information TI. The information I is represented by a large number of bits, wherein the bits are organized in a so-called sector-oriented data structure.

Figure 2:
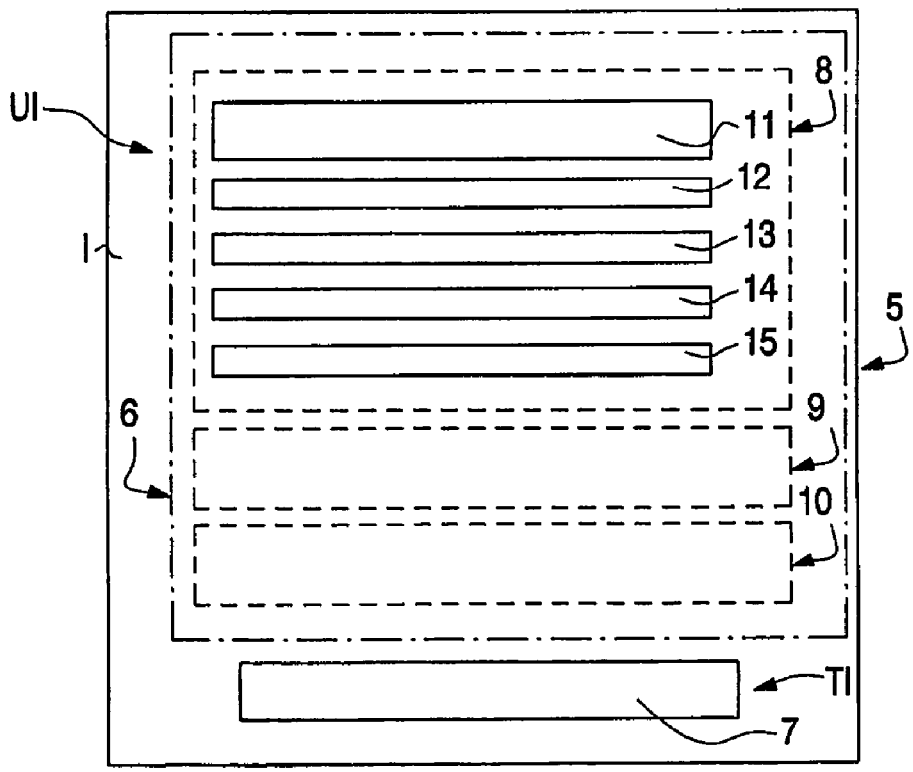
FIG. 2 shows a data structure for storing information in first memory means of a data carrier according to the invention, in accordance with the first example of embodiment of the invention.

FIG. 2 shows such a sector-oriented data structure for storing the information I in the first memory means 5. The first user memory area 6 comprises a large number of data sectors, a first data sector 8 and a second data sector 9 and a third data sector 10 being shown as representatives thereof. Each of the large number of data sectors comprises a sector access control byte 11 and four sector data bytes 12, 13, 14 and 15, which situation is illustrated by the first data sector 8, acting as representative for the large number of data sectors. The sector access control byte 11 is provided for storing control data, by means of which access to the four sector data bytes 12, 13, 14 and 15 is enabled or prevented. The sector data bytes 12, 13, 14 and 15 are provided for storing user data for representing the user information UI. The test memory area 7 is formed by a test information byte, which is located at the highest memory address of the first memory means 5. It should be mentioned in this context that any other memory address may also be provided therefore within the first memory means 5. It should additionally be mentioned that the stored information I does not have to stored exclusively in the form of bytes, but may also be stored as logical nibbles each consisting of 4 bits or as logical words each consisting of 16 bits or by means of any other bit grouping.

The circuit 2 illustrated in FIG. 1 further comprises two memory means 16, which take the form of a ROM. The second memory means 16 comprise a second user memory area 17 and a reference memory area 18. The second user memory area 17 is provided for the unmodifiable storage of constants, which are required for processing the data by means of the data processing means 4 or for generating response data AD, which will not be looked at in any more detail below, however. The reference memory area 18 is designed for unmodifiable storage of reference information RI. As with the first memory means 5, the constants and the reference information RI are represented by a large number of bits, which are organized in a data structure which is similar to the data structure in the first memory means 5. It should be mentioned, however, that the data structure present within the second memory means 16 may in principle be independent, i.e. different from the data structure present in the first memory means 5.

The circuit 2 further comprises detection means 19, to which the test information TI which may be read out from the first memory means 5 and the reference information RI which may be read out from the second memory means 16 may be supplied and which are designed, with the aid of the read-out test information TI and the read-out reference information RI, to detect a modification of the originally stored test information TI brought about by an ambient parameter acting on the first memory means 5. To this end, the detection means 19 comprise first comparison means 20, which are designed to access the first memory means 5—specifically the test memory area 7—for the purpose of reading out the test information TI. The first comparison means 20 are additionally designed to access the second memory means 16—specifically the reference memory area 18—for the purpose of reading out the reference information RI. The first comparison means 20 are additionally designed to compare the stored test information TI with the stored reference information RI. The detection means 19 are additionally designed to generate and output an indicator signal DS, which indicator signal DS is provided to indicate that modification of the originally stored test information TI brought about by an ambient parameter acting on the first memory means 5 has occurred, wherein the indicator signal DS is formed by a comparison result of the first comparison means 20 obtained as a result of the comparison of the test information TI with the reference information RI.

It should be mentioned that the indicator signal DS may also take the form of a representation of the comparison result. It should additionally be mentioned that the indicator signal DS may also provide perpetual indication of the modification of the originally stored test information TI. This is the case, for example, when the indicator signal DS represents the content of a memory cell taking the form of a PROM or when the indicator signal DS represents a conductivity state of a single-use fuse. Detection of the modification of the originally stored test information TI may be performed in the present case each time a supply voltage V sufficient for data processing occurs, prior to said data processing. It should be mentioned, however, that said detection may also be performed periodically or non-periodically during data processing.

The data processing means 4 are connected to the first memory means 5 and the second memory means 16 via a so-called bus connection B, wherein, with the aid of the bus connection B, the user information UI may be written to the first user memory area 6 of the first memory means 5 or read out from said first user memory area 6 and wherein information I representing the stored constants may be read out from the second user memory area 17. When the indicator signal DS is received, the data processing means 4 are designed to prevent access to the first memory means 5 and/or the second memory means 16. In addition, the data processing means 4 are designed to generate and output response data AD, which indicate that a modification of the originally stored test information TI brought about by an ambient parameter acting on the first memory means 5 has occurred. Once the indicator signal DS has been received, the data processing means 4 are stopped permanently from continuing to process data. Accordingly, the circuit 2 is designed to influence its operating behavior as a function of the indicator signal DS.

The response data AD may be communicated to the read/write station by the communication means 3, where they may be output, optionally in the form of visible display information, to a user of the data carrier 1.

The circuit 2 also comprises enabling means 21, which are provided irreversibly to enable functioning of the detection means 19. The enabling means 21 are designed, for this purpose, to generate and output a status signal SC, which may represent an enabling state or an inhibiting state. The first comparison means 20 of the detection means 19 are designed to receive the status signal SC, wherein, if the enabling state is represented, functioning of the detection means 19 is enabled and wherein, if the inhibiting state is represented, functioning of the detection means 19 is not enabled. Accordingly, the detection means 19 are designed to cooperate with the enabling means 21.

For the purpose of generating the status signal SC, the enabling means 21 comprise a test signal generator 22, which is designed to output a test signal SS to a first saw bow part 23, which first saw bow part 23 constitutes a component of the circuit 2. The enabling means 21 further comprise second comparison means 24, which are designed to receive the test signal SS outputtable to the first saw bow part 23. The second comparison means 24 are additionally connected to a second saw bow part 25, and are designed to receive a comparison signal SS' suppliable by means of the second saw bow part 25 of the circuit 2. The second comparison means 24 are additionally designed to compare the test signal SS with the comparison signal SS' and, if the test signal SS is identical to the comparison signal SS', to output a status signal SC representing the inhibiting state. If the test signal SS is not identical to the comparison signal SS', the second comparison means 24 are designed to output a status signal SC representing the enabling state.

The first saw bow part 23 and the second saw bow part 25 are components of a "saw bow", which saw bow, in the case of an integrated electrical circuit 2 arranged within a wafer, forms an electrically conductive connection between the first saw bow part 23 and the second saw bow part 25 within a sawing zone of the wafer, such that it may be established from the circuit 2 that the circuit 2 is arranged within the wafer and that tests may be performed which are designed not to be performable after separation of the circuit 2 from the wafer, specifically in the event of the circuit 2 being sawn out of the wafer. If the circuit 2 is detached from the wafer, the saw bow is diced, such that, when the circuit 2 has been detached from the wafer, only the first saw bow part 23 and the second saw bow part 25 remain within the circuit 2 as components of the original saw bow. Accordingly, when the saw bow is intact, the comparison signal SS' is formed by the test signal SS, whereas, when the saw bow has been cut through or destroyed, leaving only the first saw bow part 23 and the second saw bow part 25 within the circuit 2, the two signals SS and SS' are not identical to one another. Such a saw bow is known from patent document WO 02/09153 A2, the disclosure of which is deemed to be included herein.

In the data structure of the first memory means 5, illustrated in FIG. 3, the test memory area 7 from FIGS. 1 and 2 is distributed over each of the data sectors within user memory area 6, such that each data sector has its "own" test information TI assigned to it, which is represented by a test information bit pair BP, BPA and BPB respectively, the first three data sectors 8, 9 and 10 being illustrated as representatives of the large number of data sectors. In each sector access control byte 11, 11A and 11B, two bits are reserved for the test information TI, TIA and TIB respectively assigned to the respective data sector 8, 9 and 10. In this way, the advantage is achieved that, even if the ambient parameter acts in isolated manner on one zone of the first memory means 5, a modification of the originally stored test information TI, TIA or TIB respectively brought about by an ambient parameter acting on the first memory means 5 may be detected virtually one hundred percent reliably. However, it should be mentioned at this point that more than two bits may be provided within each data sector 8, 9 and 10 to represent the respective test information TI, TIA and TIB respectively and that the individual bits do not have to be arranged next to one another.

In the two examples of embodiment described above, reference was made to a data structure based on data sectors. It should be mentioned, however, that any other data structure may also be used for the first memory means 5.

The mode of operation of the data carrier 1 is explained below with reference to an example of application of the data carrier 2 according to FIG. 1. In accordance with this example of application, it should be assumed that, at a point in time when the circuit 2 of the data carrier 1 was located within a wafer at a semiconductor manufacturer's and the saw bow was intact, of which saw bow the first saw bow part 23 and the second saw bow part 25 constitute components of the circuit 2 connected together electrically conductively, test information, which is represented by the bit sequence "01010110", was stored in the test memory area 7 of the first memory means 5. It should also be assumed that only the first sector 8 is used of the large number of data sectors and that control data were stored in the sector access control byte 11 which enable encrypted access to the four sector data bytes 12, 13, 14 and 15. The four sector data bytes 12, 13, 14 and 15 are provided for storing user data representing the user information UI, which user data allow unambiguous identification of a user of the data carrier 1. The user data may be stored in the user data memory area 6 by a service provider, which provides a user with the data carrier 1, using a code for encrypted access to the four sector data bytes 12, 13, 14 and 15. It should also be assumed that a bit sequence identical to the bit sequence stored in the test memory area 7 was stored in the reference memory area 18. The circuit 2 was then severed from the wafer by sawing therefrom, wherein the saw bow was destroyed and the two saw bow parts 23 and 25 remain electrically isolated from one another within the circuit 2. From this point in time, the first test information TI can no longer be modified.

After delivery to the service provider, the user information UI required to identify the user is stored in the data carrier 1, using the code submitted to the service provider by the semiconductor manufacturer, whereupon the data carrier 1 may be used to enable access to an area of an industrial company with restricted access.

The data carrier 1 in circulation is exposed during use to a very wide range of environmental influences, which environmental influences are characterized by an ambient parameter of the data carrier 1 or the circuit 2. In the present case, it should be assumed that the data carrier 1 is brought inadvertently into the vicinity of a high-frequency welding apparatus, wherein a powerful high frequency field generated by means of the high-frequency welding apparatus deletes the contents of the first memory means 5. The memory contents are returned to an "original state", as was present originally after production of the first memory means 5 and in which the first memory means 5 comprise only bits which represent a logical one.

The user, who does not or indeed cannot notice this deletion of the contents of the first memory means 5, introduces the data carrier 1 into a communications area of a read/write station, to gain access to the restricted access zone. The signal S output by the read/write station, which signal S is formed by a high-frequency carrier wave, which is provided for communication with the data carrier 1 and for supplying the data carrier 1 with power, is received by the transceiver means 3. First of all, the supply voltage V for the circuit 2 is generated by the transceiver means 3.

As soon as the supply voltage V has exceeded a threshold value, the test signal SS is generated by the test signal generator 22 and output to the first saw bow part 23 and the second comparison means 24. At the same time, the second comparison means 24 receive the comparison signal SS', which does not match the test signal SS because the saw bow exists only in part within the circuit 2. The second comparison means 24 then generate the status signal SC representing the enabling state and output this status signal SC to the first comparison means 20.

At the first comparison means 20, the status signal SC representing the enabling state results in the first comparison means 20 accessing the first memory means 5 and reading out the test information TI modified by the ambient parameter, which test information TI is represented at this point by the bit sequence "11111111". The comparison means 20 also access the second memory means 16 and read out the originally stored reference information RI, which cannot be modified by the ambient parameter and which takes the form of the bit sequence "01010110". The test information TI is then compared with the reference information RI by the first comparison means 20, wherein the comparison reveals that a modification of the originally stored test information TI has been brought about by an ambient parameter acting on the first memory means, because the test information TI does not match the reference information RI. This detection of the modified test information TI is indicated by means of the indicator signal DS to the data processing means 4, thereby putting a stop to any future processing in the data processing means 4 beyond the generation and outputting of response data AD, which response data AD represent the meaning of the indicator signal DS. The response data AD are communicated by the transceiver means 3 to the read/write station and are there interpreted to the effect that the data carrier 1 has become invalid because the originally stored test information TI has been modified and it may therefore be assumed that any other information I stored using the first memory means 5 has also in all probability been modified.

The provision of these measures according to the invention in the case of the data carrier 1 or the circuit 2 has proven advantageous because unlawful use of the first data sector 8 may thereby be prevented virtually one hundred percent reliably, despite the contents of the sector access control byte 11 having been deleted, which could in itself open the way to fraudulently motivated use of the data carrier 2.

In the present case, use of the circuit 2 according to the invention in a data carrier 1 according to the invention has been described. It should be mentioned, however, that the circuit 2 according to the invention may also be used in a cell phone or a personal computer, for example. In this context, it should be mentioned that the circuit 2 may comprise a memory chip which includes the first memory means 5, the second memory means 16 and the detection means 19 and that such a memory chip may be used, for example, in a so-called SIM module, which SIM module is currently used in cell phones to identify a user. It should also be mentioned in this context that, in addition to the first memory means 5 and the second memory means 16 and the detection means 19, the circuit 2 according to the invention may also comprise a microprocessor or interface chips, such that a microcontroller may be provided, for example, by means of the circuit 2 according to the invention.

It should also be mentioned that the transceiver means 3 of the data carrier 1 may also take the form of an antenna configuration.

It should also be mentioned that the transceiver means 3 may be designed for capacitive or optical communication.

It should additionally be mentioned that the data carrier 1 may also be designed for conventional contact communication.

It should additionally be mentioned that the data carrier 1 may also comprise its own power supply, which may take the form for example of at least one battery or one solar cell configuration.

It should be mentioned that the enabling means 21 may take the form of a bit of a once-programmable PROM memory cell, wherein the PROM memory cell is programmed after completion of manufacturing and testing of the circuit 2 and prior to delivery of the circuit 2 to a customer. A logical value represented by this bit constitutes the state of the enabling means 21 which enables functioning of the detection means 19. In this context, it should also be mentioned that a bit pattern may also be provided instead of a single bit. If the second memory means 16 take the form of a PROM, at least one memory cell of this PROM may also be used to provide the enabling means 21.

It should additionally be mentioned that, if the enabling means 21 take the form of once-programmable means, such as for example a PROM or a fuse, the enabling means 21 may be programmed to enable the detection means 19 not by a manufacturer of the circuit 2 but by a data carrier manufacturer, who produces the data carrier 1 using the circuit 2, or by a service provider, which delivers the data carrier 1 to an end user.

It should be additionally be mentioned that the enabling means 21 may take the form of a fuse provided in the circuit 2, wherein the fuse is fused prior to delivery of the circuit 2 to a customer and wherein the fused state of the fuse, i.e. the non-conductive state of the fuse, constitutes the state of the enabling means 21 which enables functioning of the detection means 19.

It should additionally be mentioned that the second memory area 16 may be present, like the data processing means 4, as part of a hard-wired logic circuit. In this context, it should additionally be mentioned that the second memory means 16 may also take the form of a program memory of a microcomputer, wherein the reference information RI may also take the form of part of a program code. It should additionally be mentioned that the second memory means 16 may be provided solely for storage of the reference information RI.

It should additionally be mentioned that the test information TI and the reference information RI may be read out from the relevant memory means 5 and 16 using the data processing means 4 and supplied to the detection means 19.

It should additionally be mentioned that the indicator signal DS may also be outputtable to the two memory means 5 and 16 and that at least one of the two memory means 5 and 16 may be designed to influence its accessibility as a function of the indicator signal DS. One possible embodiment of the invention may be characterized in that access is no longer possible to either of the memory means 5 and 16 when the indicator signal DS is present, indicating a modification of the originally stored test information TI.

It should additionally be mentioned that the indicator signal DS may also be outputtable to the transceiver means 3 and that the transceiver means 3 may be designed to influence their communicating capacity as a function of the indicator signal DS.

It should additionally be mentioned that, in the first memory means 5, hardware-enclosed memory areas may be provided for in each case one application and that each of these memory areas may comprise its own test information TI.

The invention claimed is:

1. A data carrier comprising a circuit, which circuit comprises the following components:
   a first memory device, which is designed for modifiable storage of information, the information being modifiable by an ambient parameter of the circuit, which ambient parameter acts on the first memory device, characterized in that the first memory device comprises a test memory area, which is provided for storing test information, wherein the first memory device comprises multiple data sectors and wherein the test memory area comprises data sector-specific test memory areas within each of the multiple data sectors, wherein the test information is stored within the data sector-specific test memory areas and wherein the data sector-specific test memory areas are located in an area of each data sector that is designated for access control, and
   a second memory device is provided which is designed for unmodifiable storage of reference information, and
   detection means are provided, to which the test information which may be read out from the first memory device and the reference information which may be read out from the second memory device may be supplied, and said detection means are designed, with the aid of the read-out test information and the read-out reference information, for detecting a modification of the originally stored test information brought about by an ambient parameter acting on the first memory device.

2. A data carrier as claimed in claim 1, characterized in that the detection means comprise comparison means for comparing the stored test information with the stored reference information.

3. A data carrier as claimed in claim 1, characterized in that enabling means are provided for irreversibly enabling functioning of the detection means, and the detection means are designed to cooperate with the enabling means.

4. A data carrier as claimed in claim 1, characterized in that the detection means are designed to generate and output an indicator signal, which indicator signal is provided to indicate a modification of the originally stored test information brought about by an ambient parameter acting on the first memory device and the circuit is designed to influence its operating behavior as a function of the indicator signal.

5. A data carrier as claimed in claim 4, wherein the detection means generates and outputs an indicator signal that provides a perpetual indication of the modification of the originally stored test information.

6. A data carrier as claimed in claim 1, characterized in that the test information is formed of at least two bits, which at least two bits differ from one another with regard to their logical value.

7. A data carrier as claimed in claim 1, wherein the ambient parameter deletes the test information.

8. A data carrier as claimed in claim 1, wherein the ambient parameter renders the test information unusable.

9. A circuit, which circuit comprises the following components:

a first memory device, which is designed for modifiable storage of information, the information being modifiable by an ambient parameter of the circuit, which ambient parameter acts on the first memory device, characterized in that the first memory device comprises a test memory area, which is provided for storing test information, wherein the first memory device comprises multiple data sectors and wherein the test memory area comprises data sector-specific test memory areas within each of the multiple data sectors, wherein the test information is stored within the data sector-specific test memory areas and wherein the data sector-specific test memory areas are located in an area of each data sector that is designated for access control, and a second memory device is provided which are designed for unmodifiable storage of reference information, and detection means are provided, to which the test information which may be read out from the first memory device and the reference information which may be read out from the second memory device may be supplied, and said detection means are designed, with the aid of the read-out test information and the read-out reference information, for detecting a modification of the originally stored test information brought about by an ambient parameter acting on the first memory device;

wherein the ambient parameter is one of a short-wave light, an electromagnetic field, and a high temperature.

10. A circuit as claimed in claim 9, characterized in that the detection means comprise comparison means for comparing the stored test information with the stored reference information.

11. A circuit as claimed in claim 9, characterized in that enabling means are provided for irreversibly enabling functioning of the detection means, and the detection means are designed to cooperate with the enabling means.

12. A circuit as claimed in claim 9, characterized in that the detection means are designed to generate and output an indicator signal, which indicator signal is provided to indicate a modification of the originally stored test information brought about by an ambient parameter acting on the first memory device, and the circuit is designed to influence its operating behavior as a function of the indicator signal.

13. A circuit as claimed in claim 12, wherein the detection means generates and outputs an indicator signal that provides a perpetual indication of the modification of the originally stored test information.

14. A circuit as claimed in claim 12, wherein the ambient parameter deletes the test information.

15. A circuit as claimed in claim 12, wherein the ambient parameter renders the test information unusable.

16. A circuit as claimed in claim 9, characterized in that the test information is formed of at least two bits, which at least two bits differ from one another with regard to their logical value.

17. A circuit as claimed in claim 9, characterized in that the circuit takes the form of an integrated circuit.

* * * * *